(12) United States Patent
Hentunen

(10) Patent No.: US 9,454,658 B2
(45) Date of Patent: Sep. 27, 2016

(54) MALWARE DETECTION USING FEATURE ANALYSIS

(75) Inventor: Daavid Hentunen, Helsinki (FI)

(73) Assignee: F-Secure Corporation, Espoo (FI)

( * ) Notice: Subject to any disclaimer, the term of this patent is extended or adjusted under 35 U.S.C. 154(b) by 110 days.

(21) Appl. No.: 12/928,531

(22) Filed: Dec. 14, 2010

(65) Prior Publication Data

US 2012/0151586 A1    Jun. 14, 2012

(51) Int. Cl.
*G06F 11/00* (2006.01)
*G06F 21/56* (2013.01)

(52) U.S. Cl.
CPC .................................. *G06F 21/563* (2013.01)

(58) Field of Classification Search
CPC .. G06F 21/563; G06F 21/552; G06F 21/564; G06F 8/71; G06F 21/55; G06F 8/73
USPC ............................... 726/22–24; 713/187–188
See application file for complete search history.

(56) References Cited

U.S. PATENT DOCUMENTS

| | | | |
|---|---|---|---|
| 7,234,167 B2 * | 6/2007 | Teblyashkin et al. | 726/24 |
| 7,398,553 B1 * | 7/2008 | Li | 726/22 |
| 8,151,352 B1 * | 4/2012 | Novitchi | 726/24 |
| 8,250,655 B1 * | 8/2012 | Malanov et al. | 726/24 |
| 2003/0065926 A1 * | 4/2003 | Schultz et al. | 713/188 |
| 2003/0162575 A1 * | 8/2003 | Morota et al. | 455/575 |
| 2004/0199594 A1 * | 10/2004 | Radatti et al. | 709/206 |
| 2008/0016568 A1 * | 1/2008 | Szor et al. | 726/22 |
| 2009/0187992 A1 | 7/2009 | Poston | 726/24 |
| 2009/0288141 A1 * | 11/2009 | Khachaturov | 726/3 |
| 2011/0302654 A1 * | 12/2011 | Miettinen | 726/23 |

\* cited by examiner

*Primary Examiner* — Amir Mehrmanesh
(74) *Attorney, Agent, or Firm* — Harrington & Smith

(57) ABSTRACT

A method of identifying sections of code that can be disregarded when detecting features that are characteristic of malware, which features are subsequently used for detecting malware. The method includes, for each of a multiplicity of sample files, subdividing file code of the sample file into a plurality of code blocks and then removing duplicate code blocks to leave a sequence of unique code blocks. The sequence of unique code blocks is then compared with those obtained for other sample files in order to identify standard sections of code. The standard sections of code identified are then included within a database such that those sections of code can subsequently be disregarded when identifying features characteristic of malware.

11 Claims, 9 Drawing Sheets

| | Calc.exe | |
|---|---|---|
| Line | Sequence | Count |
| 1 | D | 3 |
| 2 | A D | 3 |
| 3 | A C D | 3 |
| 4 | A C D F | 3 |
| 5 | A C D E F | 3 |
| 6 | A C D E F G | 2 |
| 7 | A C D E F G T | 2 |
| 8 | A C D E F G Q T | 1 |
| 9 | A C D E F G Q R T | 1 |

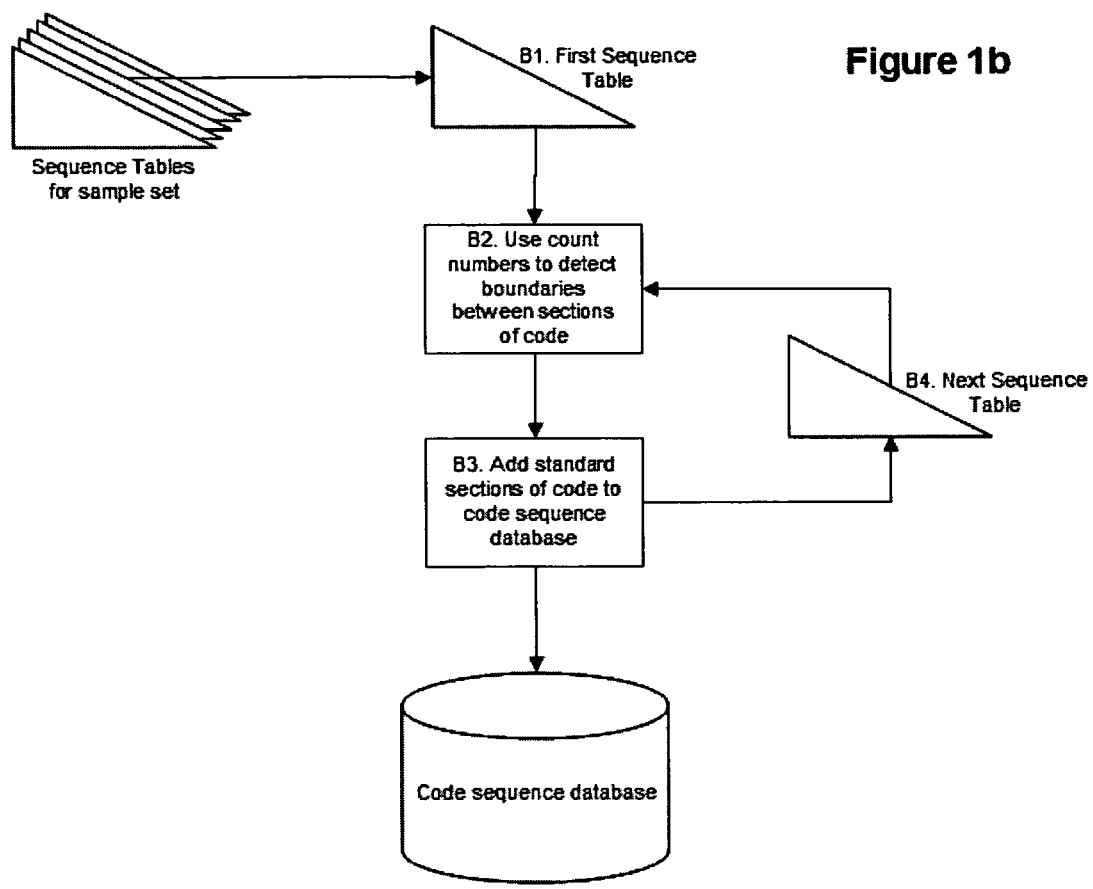

| Notepad.exe | | |
|---|---|---|
| Line | Sequence | Count |
| 1 | D | 1 |
| 2 | A D | 1 |
| 3 | A C D | 1 |
| 4 | A C D F | 1 |
| 5 | A C D E F | 1 |
| 6 | A C D E F G | 1 |
| 7 | A C D E F G T | 1 |
| 8 | A C D E F G P T | 1 |
| 9 | A C D E F G L P T | 1 |

Figure 3

| Calc.exe | | |
|---|---|---|
| Line | Sequence | Count |
| 1 | D | 1 |
| 2 | A D | 1 |
| 3 | A C D | 1 |
| 4 | A C D F | 1 |
| 5 | A C D E F | 1 |
| 6 | A C D E F G | 1 |
| 7 | A C D E F G T | 1 |
| 8 | A C D E F G Q T | 1 |
| 9 | A C D E F G Q R T | 1 |

Figure 4

| Notepad.exe | | |
|---|---|---|
| Line | Sequence | Count |
| 1 | D | 2 |
| 2 | A D | 2 |
| 3 | A C D | 2 |
| 4 | A C D F | 2 |
| 5 | A C D E F | 2 |
| 6 | A C D E F G | 2 |
| 7 | A C D E F G T | 2 |
| 8 | A C D E F G P T | 1 |
| 9 | A C D E F G L P T | 1 |

Figure 5

| Calc.exe | | |
|---|---|---|
| Line | Sequence | Count |
| 1 | D | 2 |
| 2 | A D | 2 |
| 3 | A C D | 2 |
| 4 | A C D F | 2 |
| 5 | A C D E F | 2 |
| 6 | A C D E F G | 2 |
| 7 | A C D E F G T | 2 |
| 8 | A C D E F G Q T | 1 |
| 9 | A C D E F G Q R T | 1 |

Figure 6

| paint.exe | | |
|---|---|---|
| Line | Sequence | Count |
| 1 | D | 1 |
| 2 | A D | 1 |
| 3 | A C D | 1 |
| 4 | A C D F | 1 |
| 5 | A C D E F | 1 |
| 6 | A C D E F J | 1 |
| 7 | A C D E F J M | 1 |
| 8 | A C D E F J L M | 1 |
| 9 | A C D E F J L M X | 1 |
| 10 | A C D E F J L M X Y | 1 |
| 11 | A C D E F J L M X Y Z | 1 |

Figure 7

| Notepad.exe | | |
|---|---|---|
| Line | Sequence | Count |
| 1 | D | 3 |
| 2 | A D | 3 |
| 3 | A C D | 3 |
| 4 | A C D F | 3 |
| 5 | A C D E F | 3 |
| 6 | A C D E F G | 2 |
| 7 | A C D E F G T | 2 |
| 8 | A C D E F G P T | 1 |
| 9 | A C D E F G L P T | 1 |

Figure 8

| Calc.exe | | |
|---|---|---|
| Line | Sequence | Count |
| 1 | D | 3 |
| 2 | A D | 3 |
| 3 | A C D | 3 |
| 4 | A C D F | 3 |
| 5 | A C D E F | 3 |
| 6 | A C D E F G | 2 |
| 7 | A C D E F G T | 2 |
| 8 | A C D E F G Q T | 1 |
| 9 | A C D E F G Q R T | 1 |

Figure 9

| paint.exe | | |
|---|---|---|
| Line | Sequence | Count |
| 1 | D | 3 |
| 2 | A D | 3 |
| 3 | A C D | 3 |
| 4 | A C D F | 3 |
| 5 | A C D E F | 3 |
| 6 | A C D E F J | 1 |
| 7 | A C D E F J M | 1 |
| 8 | A C D E F J L M | 1 |
| 9 | A C D E F J L M X | 1 |
| 10 | A C D E F J L M X Y | 1 |
| 11 | A C D E F J L M X Y Z | 1 |

Figure 10

| Notepad.exe |||
|---|---|---|
| Line | Sequence | Count |
| 1 | D | 50 |
| 2 | A D | 50 |
| 3 | A C D | 50 |
| 4 | A C D F | 50 |
| 5 | A C D E F | 50 |
| 6 | A C D E F G | 15 |
| 7 | A C D E F G T | 15 |
| 8 | A C D E F G P T | 1 |
| 9 | A C D E F G L P T | 1 |

Figure 11

| Line | Sequence | Count |
|---|---|---|
| 1 | D | 50 |
| 2 | A D | 50 |
| 3 | A C D | 50 |
| 4 | A C D F | 35 |
| 5 | A C D E F | 50 |
| 6 | A C D E F G | 15 |
| 7 | A C D E F G T | 15 |
| 8 | A C D E F G P T | 1 |
| 9 | A C D E F G L P T | 1 |

Figure 12

MALWARE DETECTION USING FEATURE ANALYSIS

TECHNICAL FIELD

The present invention relates to malware detection using feature analysis. More particularly, the invention relates to a method for allowing the elimination of features that are likely to result in false positives during malware scanning using a feature analysis approach.

BACKGROUND

The term "malware" is short for malicious software and is used to refer to any software designed to infiltrate or damage a computer system without the owner's informed consent. Malware can include viruses, worms, trojan horses, rootkits, adware, spyware and any other malicious and unwanted software. Many computer devices, such as desktop personal computers (PCs), laptops, personal data assistants (PDAs) and mobile phones, can be at risk from malware.

Detecting malware is often challenging, as malware may be designed to be difficult to detect, often employing technologies that deliberately hide the presence of malware on a system. For example a malware application may not show up on the operating system tables that list currently-running processes on a computer.

An anti-virus application for detecting viruses and other malware may make use of various methods to detect malware including file scanning, integrity checking and heuristic analysis. During file scanning, the anti-virus application examines files for the presence of virus fingerprints or "signatures" (i.e. code sequences) that are characteristic of known malware. Typically, this requires that the anti-virus application make use of a database containing the signatures pushed to it, for example from an Internet based server. An example of a heuristic analysis detection approach involves collecting features arising during execution of a code sample. Examples of features that may be collected during execution are stacks, heaps, strings, API calls and their parameters. Due to the malicious nature of the software being searched for, execution cannot be performed live on a computer device, so instead the execution takes place in a sandbox environment. A sandbox is a virtual environment that has a very tightly-controlled set of resources. This allows unknown or untrusted software to be executed in such a way that any malicious activity does not affect the computer device on which it is being executed. The software is executed within the sandbox, and features of the execution of the file code as described above are collected and analysed to detect the existence of malware. Analysis may involve comparing the detected features against features previously identified by analysing known malware (that analysis being done at a back end server of the anti-virus application provider).

When trying to detect malware, it is important to avoid false positives as much as possible. A false positive is returned when the anti-virus application identifies software as being suspected malware, when in fact it is not. False positives create inconvenience and product dissatisfaction for users, who only want the anti-virus application to detect genuine malware, and are also undesirable from the point of view of the anti-virus application providers as they result in increased workload arising from customer queries and complaints.

A method for reducing false positives might be as follows:

i) scan a sample set of clean files and collect all features, counting each unique feature only once and ignoring duplicates;
ii) scan a set of malware files and collect all features, counting each unique feature only once and ignoring duplicates;
iii) remove the features found in the set of clean files from those found in the malware files;
iv) determine the most common feature that is found in the set of malware files;
v) if the most common feature within the set of malware files is present in more than a certain pre-defined number of files, then that feature can be saved to a database as being suitable for generic detection of malware, and the files in which that feature is found are removed from the inspected set of malware files;
vi) repeat from step iv) looking at the most common feature found in the remaining files in the set of malware files until a minimum feature count is reached, and ignore all further features.

The features recorded on the database are identified as being characteristic of that malware sample, and are therefore distributed to clients running the anti-virus application.

Despite such efforts to eliminate features likely to give rise to false positives, there remains a high risk of features being selected that are unsuitable for malware detection. The empirical nature of the feature rejection process also gives rise to a lack of confidence in the chosen features. It is possible of course to use the created database of features to scan a further selection of known clean files, and then remove any features from the database that identify any of the known clean files as malware. However this process can take a considerable amount of time, and still does not provide any certainty that all the features are suitable.

SUMMARY

It is an object of the present invention to improve the confidence of a feature analysis-based approach to malware detection. This may be achieved by analysing a possibly large number of collected samples of code and identifying standard sections of code that should be ignored when analysing features during execution of a code sample.

According to a first aspect of the invention, there is provided a method of identifying sections of code that can be disregarded when detecting features' that are characteristic of malware, which features are subsequently used for detecting malware. The method first comprises, for each of a multiplicity of sample files, subdividing file code of the file into a plurality of code blocks. Duplicate code blocks are then removed to leave a sequence of unique code blocks. The sequence of unique code blocks is then compared with those obtained for other sample files in order to identify standard sections of code. The standard sections of code identified in the comparison are then included in a database such that those sections of code can subsequently be disregarded when identifying features characteristic of malware.

Embodiments of the present invention may provide a method that allows the elimination of features that are likely to result in false positives during malware scanning using a feature analysis approach. Embodiments of the present invention may also provide a faster method of scanning a computer for malware, and which may require less processing power than conventional scanning methods.

The step of subdividing file code into a plurality of code blocks may comprise subdividing the file code into blocks of one or more instructions, generating a signature for the instruction block, and using that signature as the code block. This signature may be a cyclic redundancy check value, and instruction parameters may be removed from an instruction block before generating a signature.

The step of comparing the sequence of unique code blocks with those obtained for other sample files in order to identify standard sections of code may comprise creating a sequence table for the file, a first row of the table including the first code block of the sequence of unique code blocks and each subsequent line adding on the next code block in the sequence, the code blocks within each row being reordered according to a predefined sorting procedure; and searching sequence tables of other files for matching rows.

For each row in the sequence table, a count number may be included that indicates the number of times an identical row is found in the sequence tables for the other sample files.

The step of identifying standard sections of code may comprise detecting distinct boundaries in the count numbers within a sequence table, and may further comprise ignoring false positive drops in the count numbers.

The standard sections of code may be associated with one or more packers or compilers.

According to a second aspect of the invention, there is provided a method of identifying features that are characteristic of a malware sample, which features are subsequently used for detecting malware. The method first comprises identifying sections of malware sample code that match with entries in a database of known and trusted sections of code. The malware sample code is then executed in a sandbox and execution features are detected. Those features resulting from execution of the identified sections are rejected, and the remaining features, or a subset of those remaining features, are utilised to detect malware.

Said database of known and trusted sections of code may be constructed using the method of the first aspect of the invention described above.

According to a third aspect of the invention, there is provided a program which, when run on a computer, causes it to identify sections of code that can be disregarded when detecting features that are characteristic of malware, which features are subsequently used for detecting malware. For each of a multiplicity of sample files, the program causes the computer to subdivide file code of the file into a plurality of code blocks. The program then causes the computer to remove duplicate code blocks to leave a sequence of unique code blocks, then compare the sequence of unique code blocks with those obtained for other sample files in order to identify standard sections of code. The program then causes the computer to include any identified standard sections of code within a database such that those sections of code can subsequently be disregarded when identifying features characteristic of malware.

According to a fourth aspect of the invention, there is provided a program which, when run on a computer, causes it to identify features that are characteristic of a malware sample, which features are subsequently used for detecting malware. The program causes the computer to identify sections of malware sample code that match with entries in a database of known and trusted sections of code. The program then causes the computer to execute the malware sample code in a sandbox and detect execution features, and then reject those features resulting from execution of the identified sections. The remaining features, or a subset of those remaining features, are then utilised to detect malware.

According to a fifth aspect of the invention, there is provided a computer configured to identify sections of code that can be disregarded when detecting features that are characteristic of malware, which features are subsequently used for detecting malware. The computer is configured, for each of a multiplicity of sample files, to subdivide file code of the file into a plurality of code blocks. The computer is configured to then remove duplicate code blocks to leave a sequence of unique code blocks, and then compare the sequence of unique code blocks with those obtained for other sample files in order to identify standard sections of code. The computer is further configured to then include any identified standard sections of code within a database such that those sections of code can subsequently be disregarded when identifying features characteristic of malware.

According to a fifth aspect of the invention, there is provided a computer configured to identify features that are characteristic of a malware sample, which features are subsequently used for detecting malware. The computer is configured to identify sections of malware sample code that match with entries in a database of known and trusted sections of code. The computer is then configured to execute the malware sample code in a sandbox and detect execution features, and then reject those features resulting from execution of the identified sections. The computer is then configured to utilise the remaining features, or a subset of those remaining features, to detect malware.

BRIEF DESCRIPTION OF THE DRAWINGS

FIGS. 1a and 1b are a flow diagrams showing two parts of a procedure for identifying standard and trusted code sections;

FIGS. 3 and 4 show code block sequence tables for respective different samples;

FIGS. 5 and 6 show respectively the sequence tables of FIGS. 3 and 4 updated following comparison with one another;

FIG. 7 shows a code block sequence table for a further, different sample;

FIGS. 8 and 9 show respectively the sequence tables of FIGS. 5 and 6 updated following comparison with the sequence table of FIG. 7;

FIG. 10 shows the sequence table of FIG. 7 updated following comparison with the sequence tables of FIGS. 5 and 6;

FIG. 11 shows the sequence table of FIG. 8 updated following comparison with the sequence tables of a multiplicity of further, different samples;

FIG. 12 shows a sequence table containing a count number fluctuation;

DETAILED DESCRIPTION

Figure 1A:
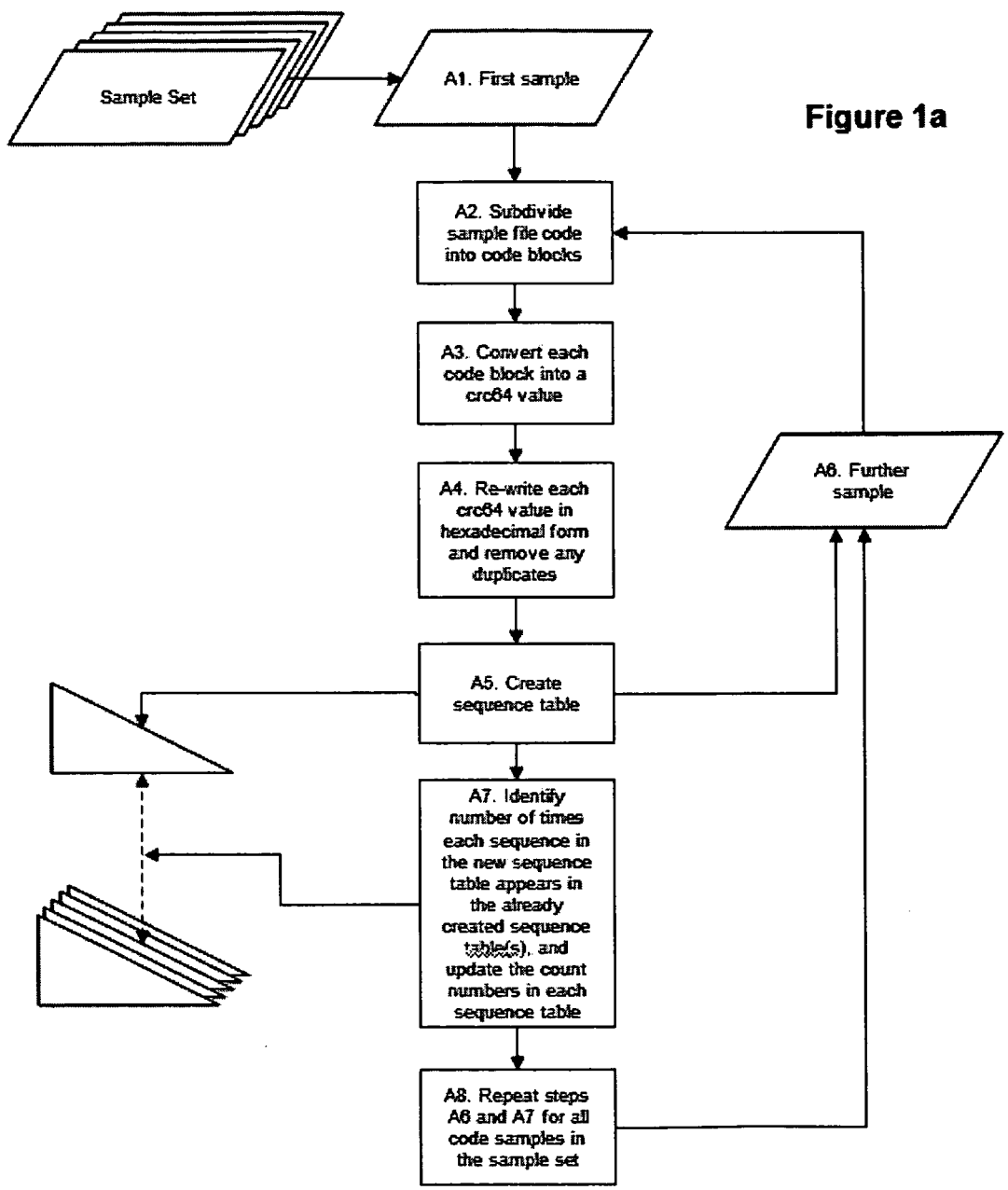

As discussed above, current anti-virus detection techniques can return false positives which create inconvenience and product dissatisfaction for users, and increased workload for the anti-virus application provider. This problem of false positives being returned can arise in particular due to the initial selection and distribution (to clients) of features that are common to both clean files and malware and the failure to eliminate these during any subsequent screening process.

An approach will now be described that can be used to greatly reduce the number of unsuitable features that are selected for malware detection, and therefore to reduce the number of false positives. The approach involves creating a database of code sequences that are found at the start of file code and that can be disregarded or ignored when performing malware detection techniques, in particular heuristic analysis such as feature analysis. Typically, the procedures are carried out at a backend server or servers operated by a provider of an anti-virus application, and where the anti-virus application itself is run on client computers ("clients") that subscribe to the application. Once collected, a feature set for a particular malware sample is pushed out to the clients via the Internet.

File code can be seen as comprising a number of sections of code which correspond to the processes carried out during execution of the code. For example, prior to the author-written section of code (that is, for example, a specifically written piece of code that actually performs the malicious operations) there can be a section of code that corresponds to a compiler. A compiler is a computer program that transforms code written in a programming language into another computer language, for example creating an executable file (e.g. in a binary form) from the file code. A compiler may provide multiple compiling options, to optimise the code for either speed or size. There are a number of commonly used compilers. Prior to the compiler section of code there may also be one or a number of further sections of code which correspond to packers, protectors and/or obfuscators. There are a number of commonly used packers that are available for packing code, for example the UPX packer. Generally, packers provide compression to reduce the size of files. However some packers provide protection and/or obfuscation for the code. These obfuscating packers are often used for nefarious reasons in malware but are also used in legitimate software to protect the code from being reverse engineered.

With a number of common packers and compilers being available, it is unlikely that new compilers and/or packers will be created each time a new piece of software or malware is written. This leads to similar initial sections of code being found in file code, whether it be code for legitimate software or malware. These initial sections of code (corresponding to compilers, packers, etc) can be thought of as "standard" sections of code that are executed before the execution of the author-written section of code.

FIGS. 1a and 1b are flow diagrams that illustrate a two-part method of identifying standard sections of code by analysing a large database of trusted samples (and possibly malware files). Referring firstly to FIG. 1a, the steps of the method are:

A1. Take a first sample from a sample set.
A2. Subdivide the sample file code into code blocks.
A3. Convert each code block into a crc64 value (i.e. a 64 bit cyclic redundancy check value).
A4. Re-write each crc64 value in hexadecimal form and remove any duplicates, i.e. so that only unique hexadecimal blocks remain.
A5. Create a sequence table for the sample, with the next hexadecimal block in the execution sequence being added to each new line, and with each line being arranged in numerical order and having an associated count number of 1.
A6. Repeat steps A2 to A5 for a further sample from the sample set.
A7. Identify the number of times each sequence in the new sequence table appears in the already created sequence table, and update the count numbers in the new sequence table.
A8. Repeat steps A6 and A7 for each further sample in the sample set, considering at step A7 all of the already created sequence tables when updating the new sequence table.

Once a sequence table has been created for each sample in the sample set, the method proceeds to the second part as shown in FIG. 1b:

B1. Take a first sequence table for a sample in the sample set.
B2. Use the count numbers in the sequence table to detect any boundaries between sections of code within a sample, and use boundaries to identify standard code sections.
B3. Add any identified standard sections of code (in the original order and with duplicates reintroduced) to a code sequence database.
B4. Repeat steps B2 to B3 for all sequence tables for the samples in the sample set in order to construct complete standard code section database.

Figure 2:
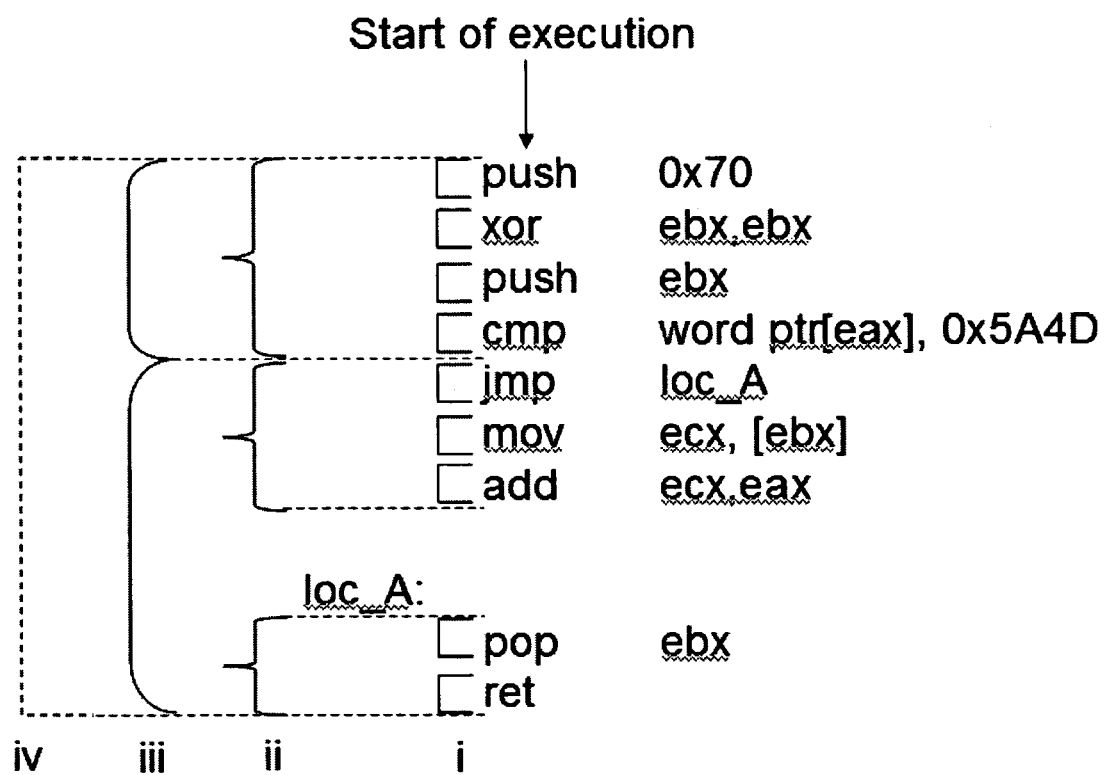
FIG. 2 shows an example of an instruction set in a section of file code, indicating possible code block sizes.

The method can be further illustrated by considering a specific example. Assume that at step A1 the first sample selected is a file "notepad.exe" that is packed with UPX and compiled by a compiler A. In step A2, the sample file code is subdivided into code blocks. The size of the code blocks can be on an instruction level, a basic block level, or on a functional level. FIG. 2 shows an example of an instruction set in a section of file code. The four different sets of brackets on the left that separate the instructions indicate possible code block sizes as set out below:
  i) instruction level
  ii) basic block level 1
  iii) basic block level 2
  iv) whole function level Two basic block levels are shown in ii) and iii). The size of a basic block level may vary according to the execution process. For example, different ways in which the code is executed at a branch instruction may produce different basic block level sizes. Alternatively a basic block level size may be set to a pre-determined number of instructions, irrespective of execution process. This value may for example be in the range of 15 to 50.

Once the file code has been broken up into code blocks, each code block is converted into a crc64 value, as indicated in step A3. In order to be able to use these code blocks to compare with code blocks in other sample files, only the instruction type is used when creating the crc64 value and not the instruction values as well. This is exemplified in the tables below, which show a code block for two different applications that have been compiled by the same compiler, A:

| | | |
|---|---|---|
| Application 1 | push 0x70 | 6A 70 |
| Compiled with A | xor ebx,ebx | 33 DB |
| | cmp word ptr[eax], 0x5A4D | 66 81 38 4D 5A |
| | crc64(6A 70 33 DB 66 81 38 4D 5A) = X | |
| Application 2 | push 0x33 | 6A 33 |
| Compiled with A | xor ebx,ebx | 33 DB |
| | cmp word ptr[eax], 0xFF23 | 66 81 38 FF 23 |
| | crc64(6A 33 33 DB 66 81 38 FF 23) = Y | |

From the two tables above, it is clear that the two crc64 values X and Y are different, X≠Y. If, however, only the instruction types are used as indicated in the table below, there is a different outcome:

| Instruction | Instruction type |
| --- | --- |
| push <immediate value> | BE EF |
| xor ebx,ebx | CA FE |
| cmp word ptr[eax], <immediate value> | FA CE |

Application 1 crc64 value becomes: crc64(BE EF CA FE FA CE)=Z
Application 2 crc64 value becomes: crc64(BE EF CA FE FA CE)=Z
Now we can see that Z=Z.

At this point, the sample notepad.exe file code has been converted into a long string of crc64 values. In order to be manageable, in step A4 each crc64 value is converted into a sixteen figure hexadecimal representation. For simplicity, in this example, letters shall be used to represent these hexadecimals, e.g. the symbol "A" represents the hexadecimal value "1122334455667788". Using this simplified nomenclature, the notepad.exe sample can be represented by the following sequence of code blocks:
D D D A C F E F E G D T P L A
Removing the duplicates will leave:
D A C F E G T P L The next stage, indicated by step A5, is to create a sequence table for the sample. A new line is added for each code block. In addition, the hexadecimal representations are re-ordered within each line in numerical order (shown below as alphabetical order for ease of illustration). Following the example above, the notepad.exe sample would return a sequence table as shown in FIG. 3. As this is the first sample taken from the sample group, there are no other sequence tables to compare this with, and the count numbers will remain as 1 for all sequences in the table.

In step A6, a second sample is taken. For example, the second sample may be "calc.exe" which has also been compiled by compiler A and packed by UPX. Steps A2 to A5 are repeated, and the calc.exe sample is re-written as:
D A C D A C F E D A C F E G D T C Q R
Removing the duplicates will leave:
D A C F E G T Q R Continuing the method, in step A7, the sequence table for calc.exe is created, which is shown in FIG. 4. There are now two sequence tables that can be compared, and on comparison it is clear that lines 1 to 7 are identical, so in step A7 the count numbers in both sequence tables are updated as shown in FIGS. 5 and 6.

After creating the sequence table for the second sample (and having updated the sequence table for the first sample), step A8 is reached. A third sample is taken (step A6) and steps A2 to A7 repeated. For example, a third sample might be "paint.exe" that is packed with UPX, but is compiled with compiler B rather than compiler A. The hexadecimal sequence (again using the simplified alphabetic representation for the sixteen digit hexadecimal values) for this sample is:
D A A D C C A F D E A E J M L X Y Z
Removing the duplicates will leave:
D A C F E J M L X Y Z
This provides an initial sequence table as shown in FIG. 7. When the sequences in this table are compared to the sequences in the existing tables (for notepad.exe and calc.exe), the updated table shown in FIG. 10 is created. [FIGS. 8 and 9 show the updated tables for notepad.exe and calc.exe taking into account the sequences contained in paint.exe.]

The method repeats until sequence tables have been created for each sample within the sample set. FIG. 11 shows what the notepad.exe sample sequence table might look like once the first part of the method has been completed and all samples (e.g. several thousand samples) have been analysed.

In some instances, the count numbers in a sequence table may contain "fluctuations" or "false positive drops". FIG. 12 shows an example of a sequence table with a false positive drop between lines 3 and 4. False positive drops such as this can be caused by a section of code being executed in a different order. For example, a section of code corresponding to Packer A in Sample X is executed in a different order to the section of code corresponding to Packer A for Sample Y. These false positive drops are handled by ignoring sequences that have longer corresponding sequences with higher count numbers. For example, in FIG. 12, the sequence in line 4 with count number 35 (A C D F) is ignored, as line 5 shows a longer corresponding sequence (A C D E F) with a higher count number of 50.

Considering further the second part of the method illustrated in FIG. 1b, step B1 takes a first sequence table as created in the first part of the method. For example, the notepad.exe table of FIG. 11. In step B2, the count numbers in the sequence table are used to detect boundaries between sections of code within the sample. In FIG. 11, two clear boundaries are shown. Rows 1 to 5 of the sequence table match with 50 other files in the sample set, rows 6 and 7 match with 15 other files in the sample set, and rows 8 and 9 are unique within the sample set. With reference to the original block sequence, i.e. before the removal of duplicates and the reordering (namely D D D A C F E F E G D T P L A), the boundaries appearing in the sequence table suggests that the sequences prior to blocks G and P are common code sequences, and the sequence including block P and beyond is the author written code, i.e.:
D D D A C F E F E ** G D T * P L A
where ** indicates start of the compiler section of code and * indicates the start of the author-written code. In step B3, the identified standard sections of code are then entered into a code sequence database, i.e. D D D A C F E F E, and D D D A C F E F E G D T. In step B4, the process is repeated for each sequence table for the samples in the sample set.

Figure 13:
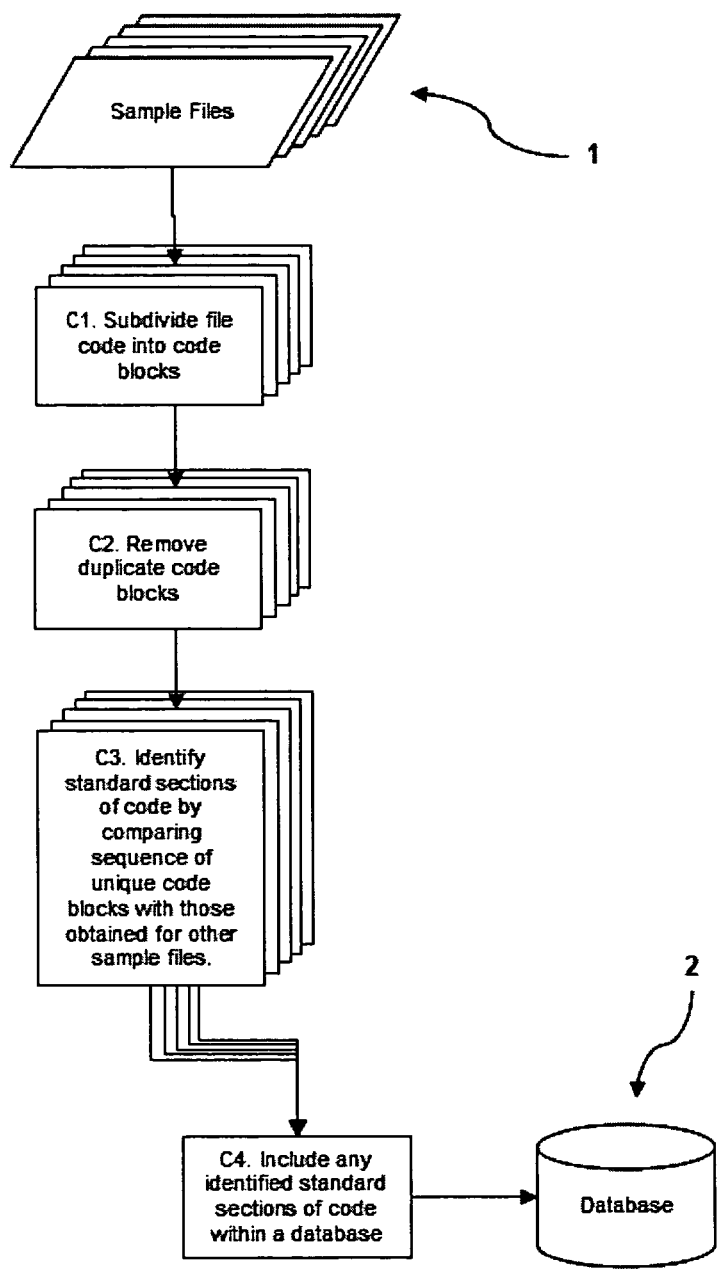
FIG. 13 is a flow diagram showing a method for identifying standard sections of code according to an alternative embodiment.

The flow diagram of FIG. 13 illustrates a generic method for identifying sections of code that can be disregarded when detecting features that are characteristic of malware, which features are subsequently used for detecting malware. The method comprises, for each of a multiplicity of sample files 1:

C1. Subdividing file code of the sample file into a plurality of code blocks.

C2. Removing duplicate code blocks to leave a sequence of unique code blocks.

C3. Comparing the sequence of unique code blocks with those obtained for other sample files in order to identify standard sections of code.

C4. Including any identified standard sections of code within a database 2 such that those sections of code can subsequently be disregarded when identifying features characteristic of malware.

Figure 14:
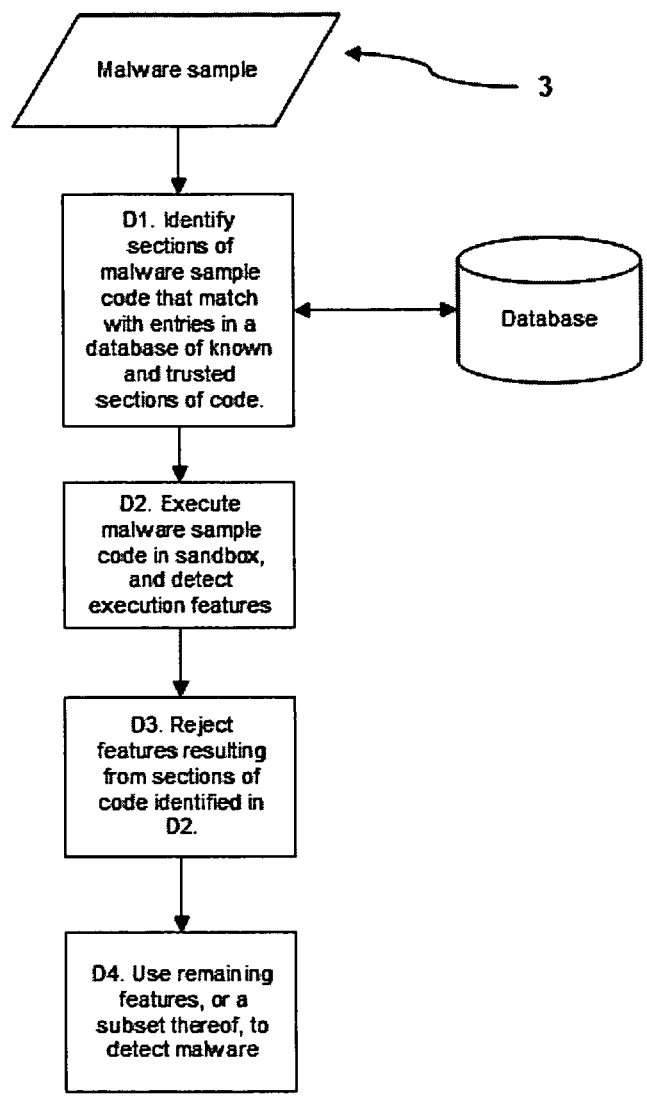
FIG. 14 is a flow diagram showing a method of identifying features that are characteristic of a malware sample, which features can subsequently be used for detecting malware.

The code sequence database that is created using the method of FIGS. 1a and 1b, or the database 2 of FIG. 13, can then be used to generate features characteristic of malware files. FIG. 14 shows a flow diagram that outlines a method of identifying features that are characteristic of a malware sample, which features can subsequently be used for detecting malware. The method comprises, for a malware sample 3:

D1. Identifying sections of malware sample code that match with entries in a database of known and trusted sections of code.

D2. Executing the malware sample code in a sandbox and detecting execution features.

D3. Rejecting those features resulting from execution of the identified sections.

D4. Utilising the remaining features, or a subset of those remaining features to detect malware.

The processes described here may be carried at a backend server operated by an anti-virus application provider. This provider will typically identify, using an automated and/or manual checking process, malware collected from the "wild", e.g. by scanning the web or collecting samples submitted by clients. In order to generate a feature set that can be pushed to clients and subsequently used (by the clients) to recognise the malware and its variants, the detected malware file is first analysed in step D1 to see if it contains any sections of code that match an entry in the code sequence database, e.g. the sequences D D D A C F E F E or D D D A C F E F E G D T considered above. If it does, then the longest identified code sequence (starting from the beginning of the malware code) is flagged. In step D2, the malware is then executed in a sandbox and features are extracted together with an execution timeline. In a post-execution phase, as indicated in step D3, those features occurring as a result of execution of the flagged code section are identified and removed from the extracted feature set. The features remaining in the feature set provide a feature set for detecting the malware and its variants, regardless of alternative packers and compilers that might be used. As described, this feature set is then pushed as an anti-virus application update to the subscribing clients. In step D4, when scanning files, the clients perform sandbox execution and look to identify the presence of the feature set in the resulting features. Other features, e.g. arising from compilers and packers, are ignored.

As well as searching for standard code sections starting from the beginning of the malware file, the malware feature identification procedure might involve identifying intermediate sections of code within a malware file that can be ignored when selecting features that characterise the malware.

It will be appreciated by the person of skill in the art that various modifications may be made to the above described methods without departing from the scope of the present invention.

The invention claimed is:

1. A method comprising:
for each of a plurality of sample files stored in at least one computer readable memory,
1) subdividing file code of the sample file into a plurality of code blocks each comprising one or more instructions, removing instruction parameters from each code block, and generating a code block signature for each code block;
2) removing duplicate code block signatures to leave a sequence of unique code block signatures, comparing the sequence of unique code block signatures obtained for sample files in order to identify common sections of code, wherein comparing the sequences of unique code block signatures comprises: creating a sequence table for the file, a first row of the table including the first code block signature of the sequence of unique code block signatures and each subsequent line adding on the next code block signature in the sequence, the code block signatures within each row being reordered according to a predefined sorting procedure; and searching sequence tables of other files for matching rows; and
including any identified common sections of code within a database, wherein inclusion of a common section of code within the database indicates that features arising from the execution of the common section of code during a malware scan using a heuristic analysis of a file are to be disregarded as features characteristic of malware when generating a feature set to characterize or identify the file as malware.

2. The method of claim 1, wherein said signature is a cyclic redundancy check value.

3. The method of claim 1, further comprising including, for each row in the sequence table, a count number that indicates the number of times an identical row is found in the sequence tables for the other sample files.

4. The method of claim 3, wherein identifying common sections of code comprises detecting distinct boundaries in the count numbers within a sequence table.

5. The method of claim 4, wherein detecting distinct boundaries in the count numbers within a sequence table comprises ignoring false positive drops in the count numbers.

6. The method of claim 1, wherein the common sections of code are associated with one or more packers or compilers.

7. A method comprising:
identifying sections of malware sample code that match with entries in a database of known and trusted common sections of code, wherein inclusion of a common section of code in the database indicates that the common section of code is to be disregarded during subsequent identification during a malware scan of features characteristic of malware, and wherein said database of known and trusted common sections of code is constructed by, for each of a plurality of sample files:
1) subdividing file code of the sample file into a plurality of code blocks each comprising one or more instructions, removing instruction parameters from each code block, and generating a code block signature for each code block;
2) removing duplicate code block signatures to leave a sequence of unique code block signatures, comparing the sequences of unique code block signatures obtained for the sample files in order to identify common sections of code, wherein comparing the sequences of unique code block signatures comprises: creating a sequence table for the file, a first row of the table including the first code block signature of the sequence of unique code block signatures and each subsequent line adding on the next code block signature in the sequence, the code block signatures within each row being reordered according to a predefined sorting procedure; and searching sequence tables of other files for matching rows; and
including any identified common sections of code within the database;
executing the malware sample code in a sandbox and detecting execution features;

rejecting those features resulting from execution of the identified sections; and utilizing at least one of the remaining features to generate a feature set for the identification of malware.

8. A computer readable memory storing a program which, when run on a computer, causes the computer to at least:
for each of a multiplicity of sample files,
1) subdivide file code of the file into a plurality of code blocks each comprising one or more instructions, removing instruction parameters from each code block, and generating a code block signature for each code block;
2) remove duplicate code block signatures to leave a sequence of unique code block signatures;
compare the sequences of unique code block signatures obtained for the sample files in order to identify common sections of code, wherein comparing the sequences of unique code block signatures comprises: creating a sequence table for the file, a first row of the table including the first code block signature of the sequence of unique code block signatures and each subsequent line adding on the next code block signature in the sequence, the code block signatures within each row being reordered according to a predefined sorting procedure; and searching sequence tables of other files for matching rows; and
include any identified common sections of code within a database, wherein inclusion of a common section of code within the database indicates that features arising from the common section of code during a malware scan using a heuristic analysis are to be disregarded as features characteristic of malware when generating a feature set to characterize or identify the file as malware.

9. A computer readable memory storing a program which, when run on a computer, causes the computer to at least:
identify sections of malware sample code that match with entries in a database of known and trusted common sections of code, wherein inclusion of a common section of code in the database indicates that the common section of code is to be disregarded during subsequent identification during a malware scan of features characteristic of malware, and wherein said database of known and trusted sections of code is constructed by, for each of at least one sample file:
1) subdividing file code of the sample file into a plurality of code blocks each comprising one or more instructions, removing instruction parameters from each code block, and generating a code block signature for each code block;
2) removing duplicate code block signatures to leave a sequence of unique code block signatures;
comparing the sequences of unique code block signatures obtained for the sample files in order to identify standard sections of code, wherein comparing the sequences of unique code block signatures comprises: creating a sequence table for the file, a first row of the table including the first code block signature of the sequence of unique code block signatures and each subsequent line adding on the next code block signature in the sequence, the code block signatures within each row being reordered according to a predefined sorting procedure; and searching sequence tables of other files for matching rows; and
including any identified common sections of code within the database; execute the malware sample code in a sandbox and detect execution features; reject those features resulting from execution of the identified sections; and utilize at least one of the remaining features to generate a feature set for the detection of malware.

10. A computer readable memory storing a program of instructions, execution of which by at least one processor configures an apparatus to at least:
for each of a plurality of sample files,
1) subdivide file code of the file into a plurality of code blocks each comprising one or more instructions, removing instruction parameters from each code block, and generating a code block signature for each code block;
2) remove duplicate code block signatures to leave a sequence of unique code block signatures;
compare the sequences of unique code block signatures obtained for the sample files in order to identify standard sections of code, wherein comparing the sequences of unique code block signatures comprises: creating a sequence table for the file, a first row of the table including the first code block signature of the sequence of unique code block signatures and each subsequent line adding on the next code block signature in the sequence, the code block signatures within each row being reordered according to a predefined sorting procedure; and searching sequence tables of other files for matching rows; and
include any identified common sections of code within a database, wherein the presence of a common section of code within the database indicates that features arising from execution of the common section of code during a malware scan using a heuristic analysis of a file are to be disregarded as features characteristic of malware when generating a feature set to characterize or identify the file as malware.

11. A computer readable memory storing a program of instructions, execution of which by at least one processor configures an apparatus to at least:
identify sections of malware sample code that match with entries in a database of known and trusted common sections of code, wherein inclusion of a common section of code in the database indicates that the common section of code is to be disregarded during an identification during a malware scan of features characteristic of malware, and wherein said database of known and trusted common sections of code is constructed by, for each of a plurality of sample files:
1) subdividing file code of the sample file into a plurality of code blocks each comprising one or more instructions, removing instruction parameters from each code block, and generating a code block signature for each code block;
2) removing duplicate code block signatures to leave a sequence of unique code block signatures;
comparing the sequences of unique code block signatures obtained for other sample files in order to identify common sections of code, wherein comparing the sequences of unique code block signatures comprises: creating a sequence table for the file, a first row of the table including the first code block signature of the sequence of unique code block signatures and each subsequent line adding on the next code block signature in the sequence, the code block signatures within each row being reordered according to a predefined sorting procedure; and searching sequence tables of other files for matching rows; and including any identified common sections of code within the database;

execute the malware sample code in a sandbox and detecting execution features;

reject those features resulting from execution of the identified sections; and utilize at least one of the remaining features to generate a feature set for the identification of malware.

* * * * *